(12) United States Patent
Pyo

(10) Patent No.: US 6,435,596 B1
(45) Date of Patent: Aug. 20, 2002

(54) AUTOMOTIVE DOUBLE FOLDING TAILGATE

(75) Inventor: Ha Geun Pyo, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/000,074

(22) Filed: Dec. 4, 2001

(30) Foreign Application Priority Data

Dec. 7, 2000 (KR) ........................................ 2000-74242

(51) Int. Cl.[7] ................................................. B60J 5/12
(52) U.S. Cl. ............... 296/106; 296/146.8; 296/146.13; 296/57.1
(58) Field of Search ........................... 296/50, 51, 57.1, 296/146.2, 146.8, 146.11, 146.12, 146.13, 190.11, 106, 26.11; 49/501, 502, 503

(56) References Cited

U.S. PATENT DOCUMENTS

| | | | | |
|---|---|---|---|---|
| 2,936,195 A | * | 5/1960 | Schutte ........................ | 296/106 |
| 3,169,792 A | * | 2/1965 | Solano Viquez ......... | 296/26.11 |
| 3,770,312 A | * | 11/1973 | Shadburn ............ | 296/190.11 X |
| 4,480,868 A | * | 11/1984 | Koto ..................... | 296/190.11 |
| 5,934,727 A | * | 8/1999 | Storc et al. ............. | 296/57.1 X |
| 6,260,916 B1 | * | 7/2001 | Hunt .................. | 296/190.11 X |

FOREIGN PATENT DOCUMENTS

| | | | | |
|---|---|---|---|---|
| DE | 3423610 A1 | * | 9/1986 | |
| FR | 1241868 | * | 4/1960 | .................. 296/106 |
| JP | 35803877 A | * | 2/1983 | ............. 296/190.11 |
| JP | 358026681 A | * | 2/1983 | ............. 296/190.11 |
| JP | 358026682 A | * | 2/1983 | ............. 296/190.11 |
| JP | 405112142 A | * | 7/1993 | .................. 296/51 |

OTHER PUBLICATIONS

Chevrolet 2002 Truck Brochure, published Sep. 2001.*

* cited by examiner

*Primary Examiner*—Stephen T. Gordon
*Assistant Examiner*—Jason Morrow
(74) *Attorney, Agent, or Firm*—Antonelli, Terry, Stout & Kraus, LLP

(57) ABSTRACT

An automotive double folding tailgate constructed to doubly fold a lid panel and a glass to position same toward floor of automobile body enabling making a cargo loading space available, the tailgate comprising: a lid panel supported on a floor of automobile body via a pivot unit, and a glass foldable at a lower end thereof via a folding unit mounted at an upper part of the lid panel and releasably mounted to a roof panel at an upper end thereof via a locking unit.

10 Claims, 8 Drawing Sheets

AUTOMOTIVE DOUBLE FOLDING TAILGATE

BACKGROUND OF THE INVENTION

1. Field of the Invention

The present invention relates to an automotive double folding tailgate, and more particularly to an automotive double folding tailgate adapted to be folded and unfolded downward to enable to open a cargo loading space.

2. Description of the Prior Art

Generally, an automobile is formed at the rear part thereof with an open space for loading cargoes. In case of an automobile with emphasis more on loading cargoes, the automobile adopts a tailgate folding upward of the body thereof and minimizes obstacle at the entrance of cargo loading space (W) to thereby enable to expedite loading of cargoes.

The tailgate thus described generally includes, as illustrated in FIGS. 1 and 2, a lid panel 1 having a glass 2, gas lifters 3 and 3' so mounted as to support the lid panel at both lateral surfaces of automobile body and to keep an opened position of the lid panel 1 when the lid panel 1 hinged at roof panel (R) is lifted upward, and a latch assembly 5 mounted underneath the lid panel 1 to be coupled to a striker installed at the automobile body to function as locking action.

Reference numeral 4 identifies a key cylinder for manipulating the latch assembly by way of an automobile key.

there is an advantage in the lifting tailgate thus described in that a relatively spacious cargo loading space (W) can be obtained in comparison to a general passenger car and cargo loading is easy but there is a disadvantage in that the lid panel 1 having a radius of gyration covering the entire cargo loading space (W) equipped with glass 2 is lifted upward to protrude backward of the automobile, posing an obstacle to cargo loading and being unable to be lifted in a very narrow space at the back of the automobile.

SUMMARY OF THE INVENTION

The present invention is disclosed to solve the aforementioned problems and it is an object of the present invention to provide an automotive double folding tailgate adapted to fold a lid panel and glass to allow being positioned toward the floor inside the automobile, thereby posing no obstacle to loading big cargo and enabling opening a cargo loading space easily even in a very narrow space at the back of the automobile.

In accordance with the object of the present invention, there is provided an automotive double folding tailgate, the tailgate comprising:

a lid panel supported on the floor of an automobile body via pivot means; and a glass foldable at a lower end thereof via folding means mounted at an upper part of the lid panel and releasably mounted to a roof panel at an upper end thereof via locking means.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, a preferred embodiment of the present invention will be described in detail with reference to the accompanying drawings.

Figure 1:
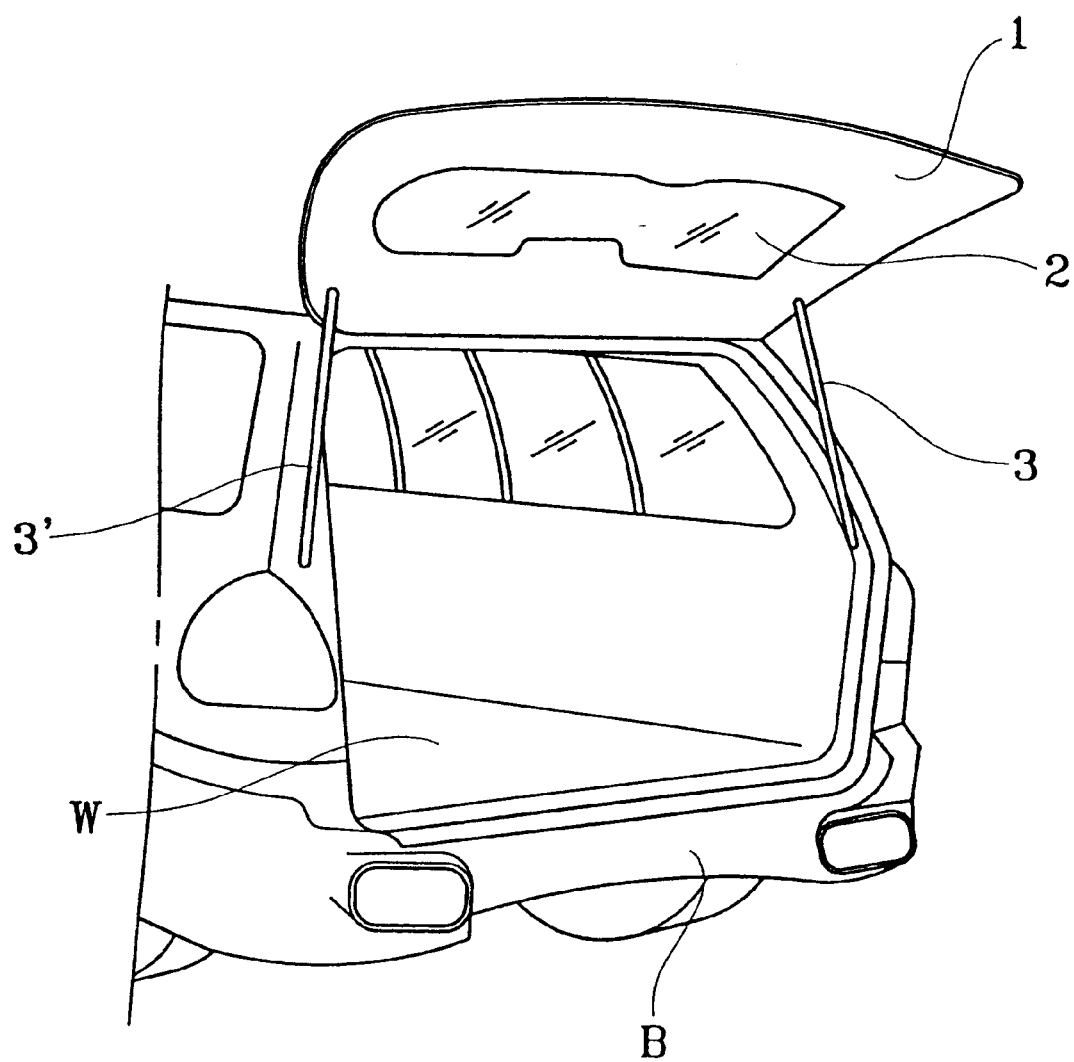
FIG. 1 is a perspective view of a tailgate according to the prior art.
Figure 2:
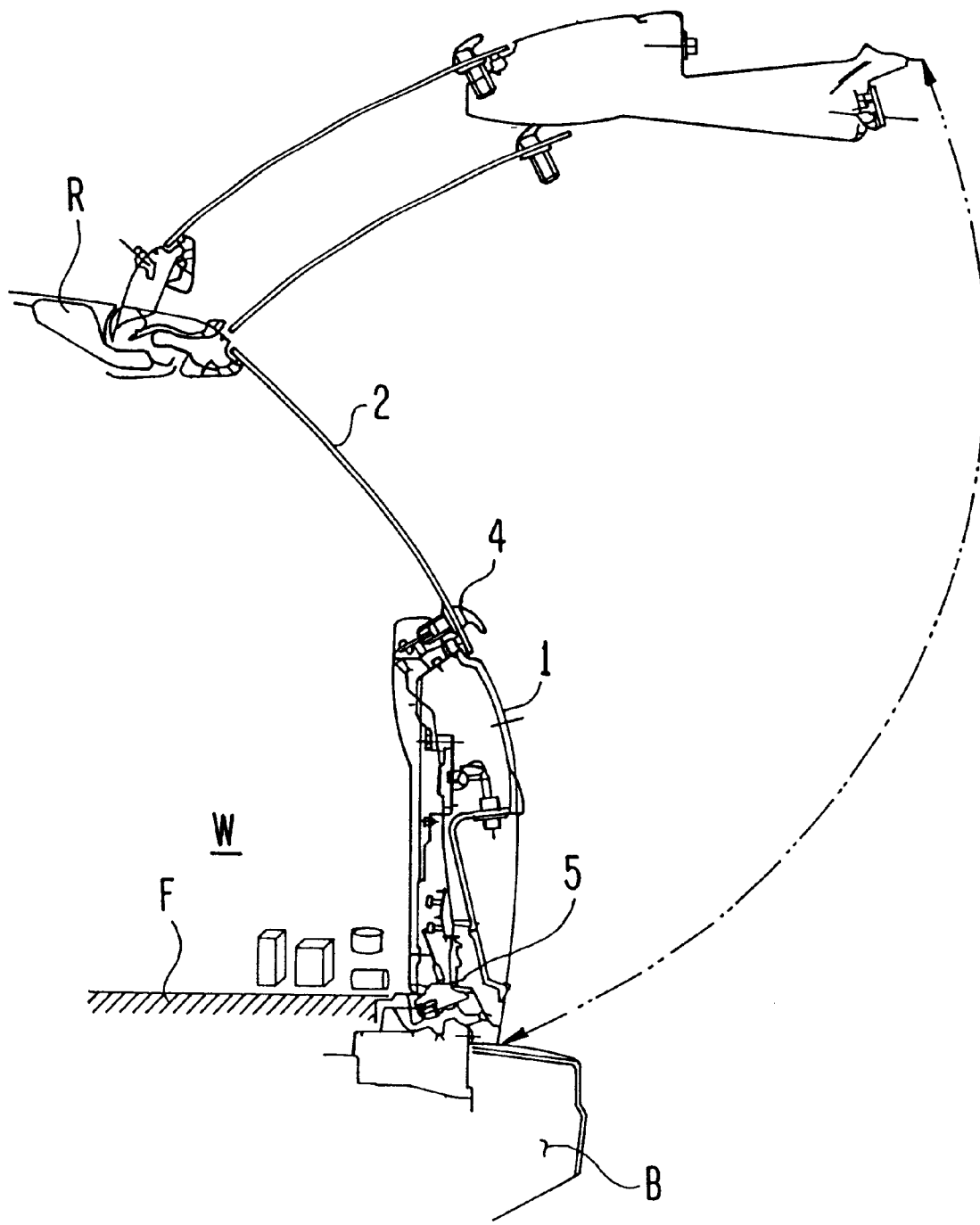
FIG. 2 is a schematic structural drawing of a tailgate according to the prior art.
Figure 3:
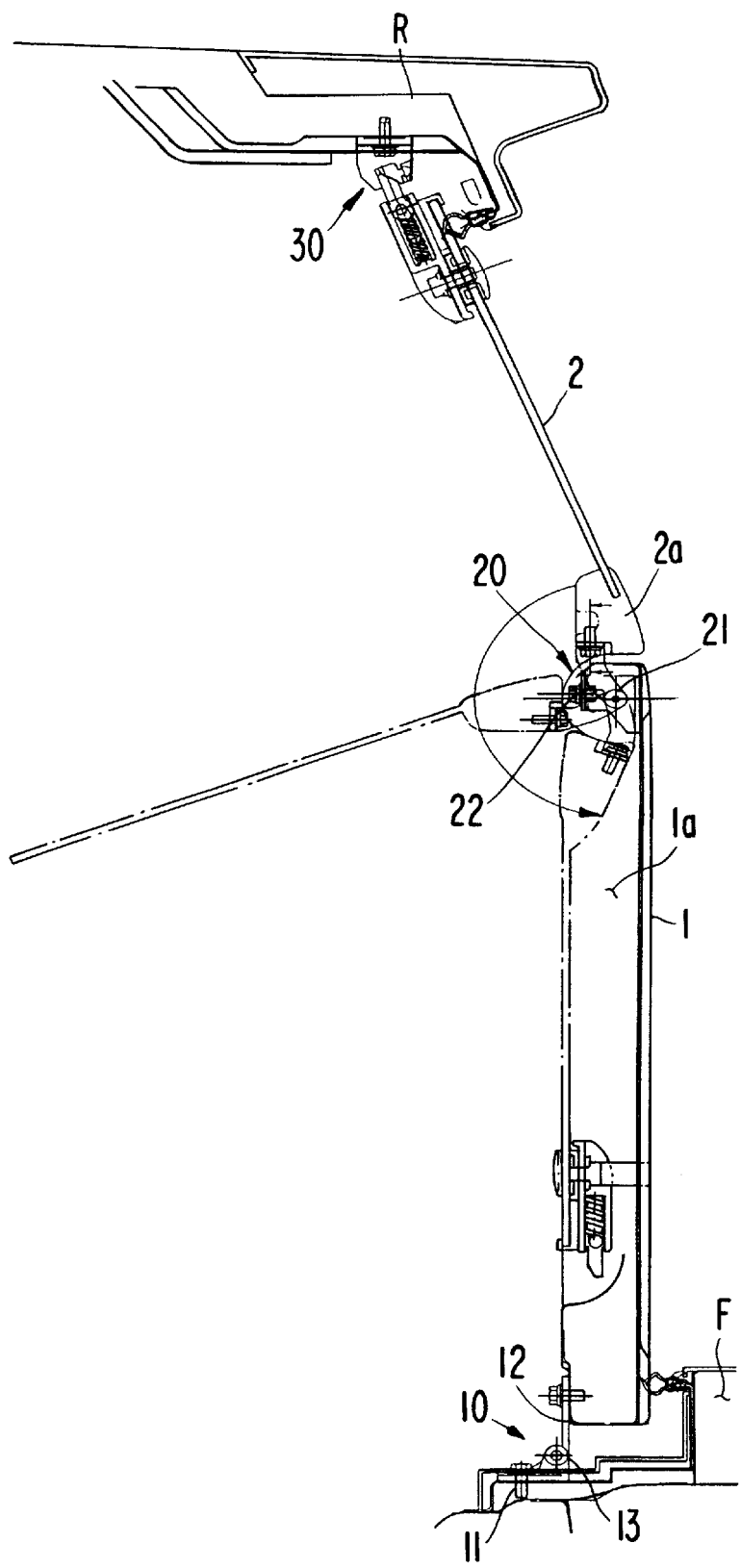
FIG. 3 is a schematic structural drawing of a double folding tailgate according to the present invention.

FIG. 3 is a schematic structural drawing of a double folding tailgate according to the present invention, where the tailgate includes a lid panel 1 supported on a floor (F) of automobile body via pivot means 10, and a glass 2 foldable at a lower end thereof via folding means 20 mounted at an upper part of the lid panel 1 and releasably mounted to a roof panel (R) at an upper end thereof via locking means 30.

The pivot means 10 includes a fixation bracket 11 fixed the floor (F) of the automobile body, a connection bracket 12 fixed to a lower end of the lid panel 1 and a hinge pin 13 coupled between the two brackets 11 and 12 and functioning as a pivot shaft axle when the lid panel 1 is turned backward into interior of the automobile.

Figure 4:
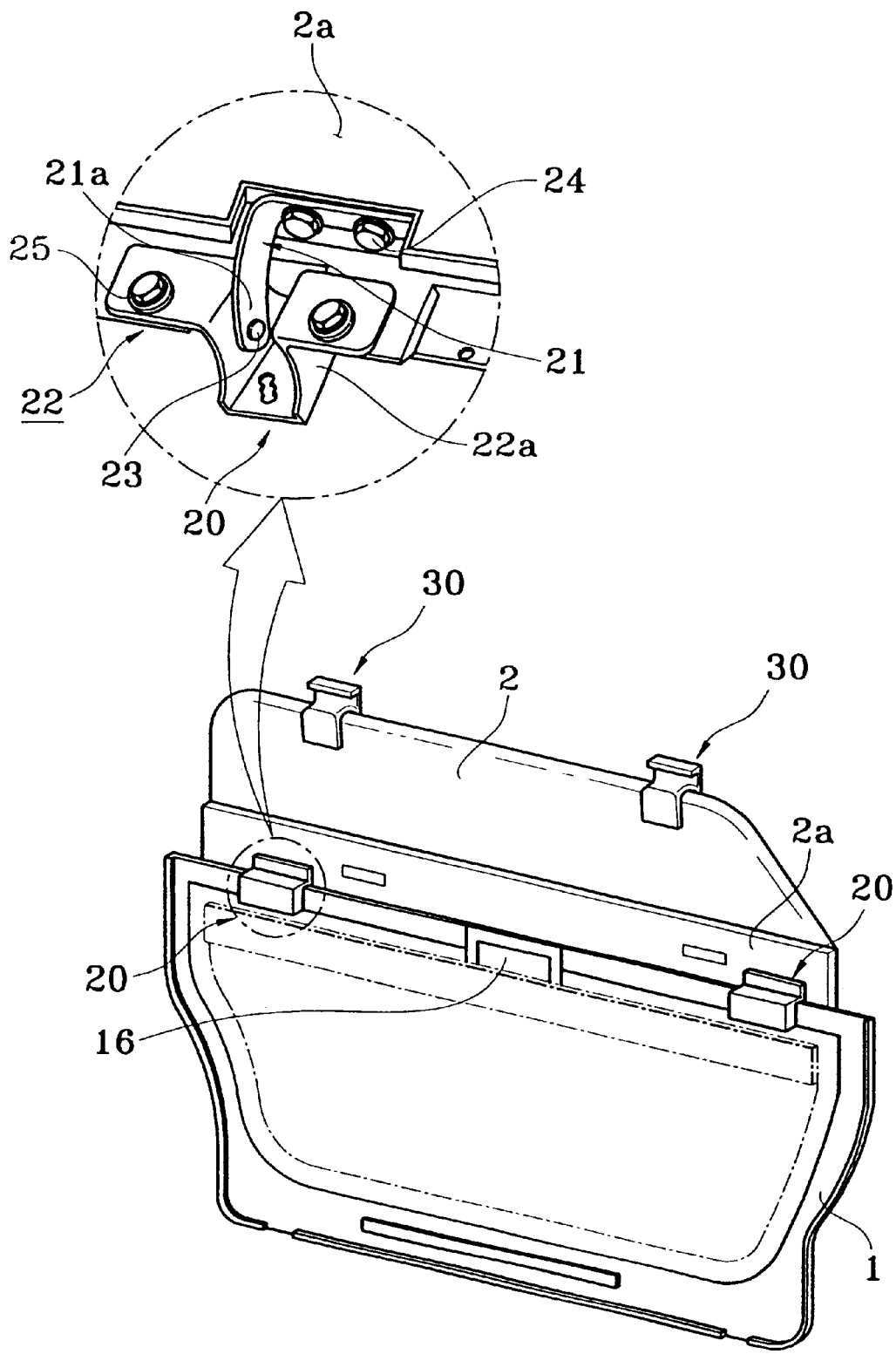
FIG. 4 is a perspective view of a double folding tailgate according to the present invention.
Figure 5:
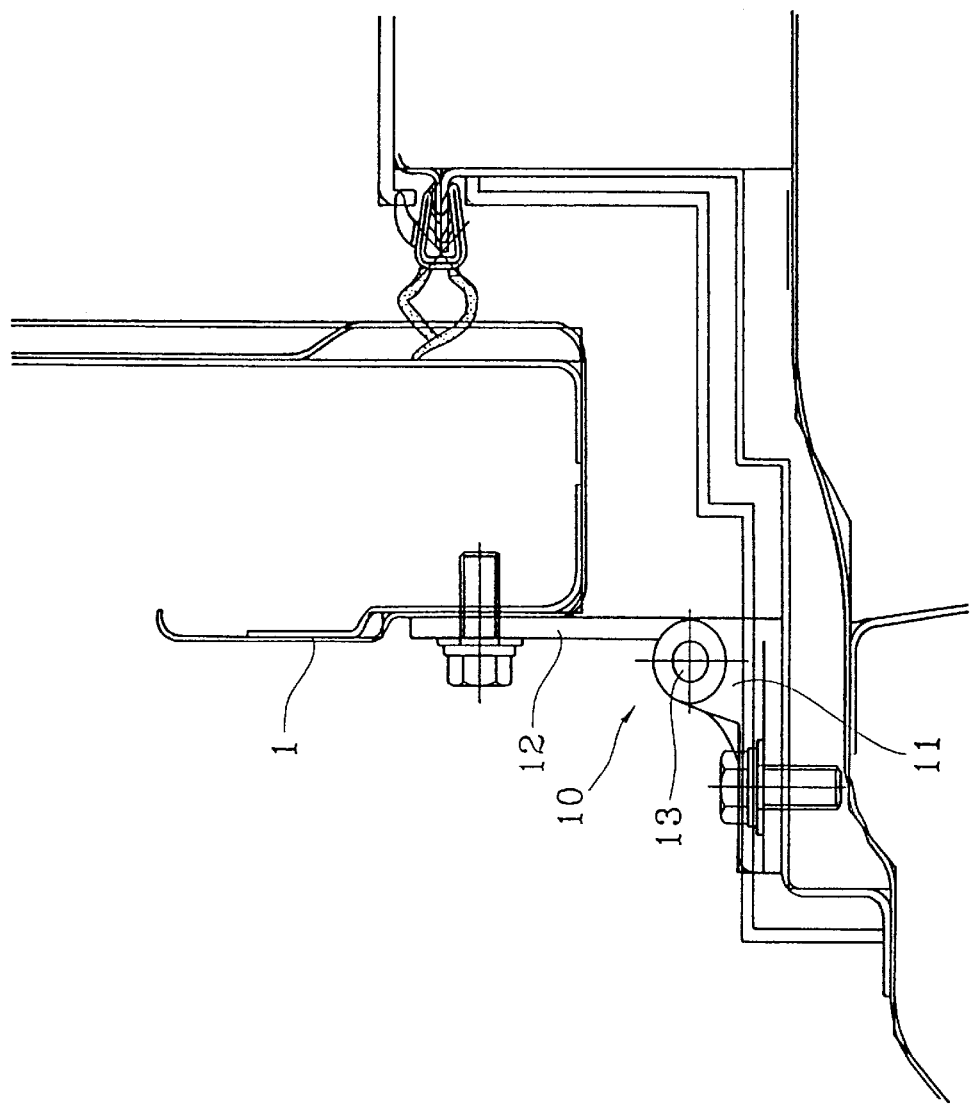
FIG. 5 is a detailed drawing of pivot means according to the present invention.
Figure 6:
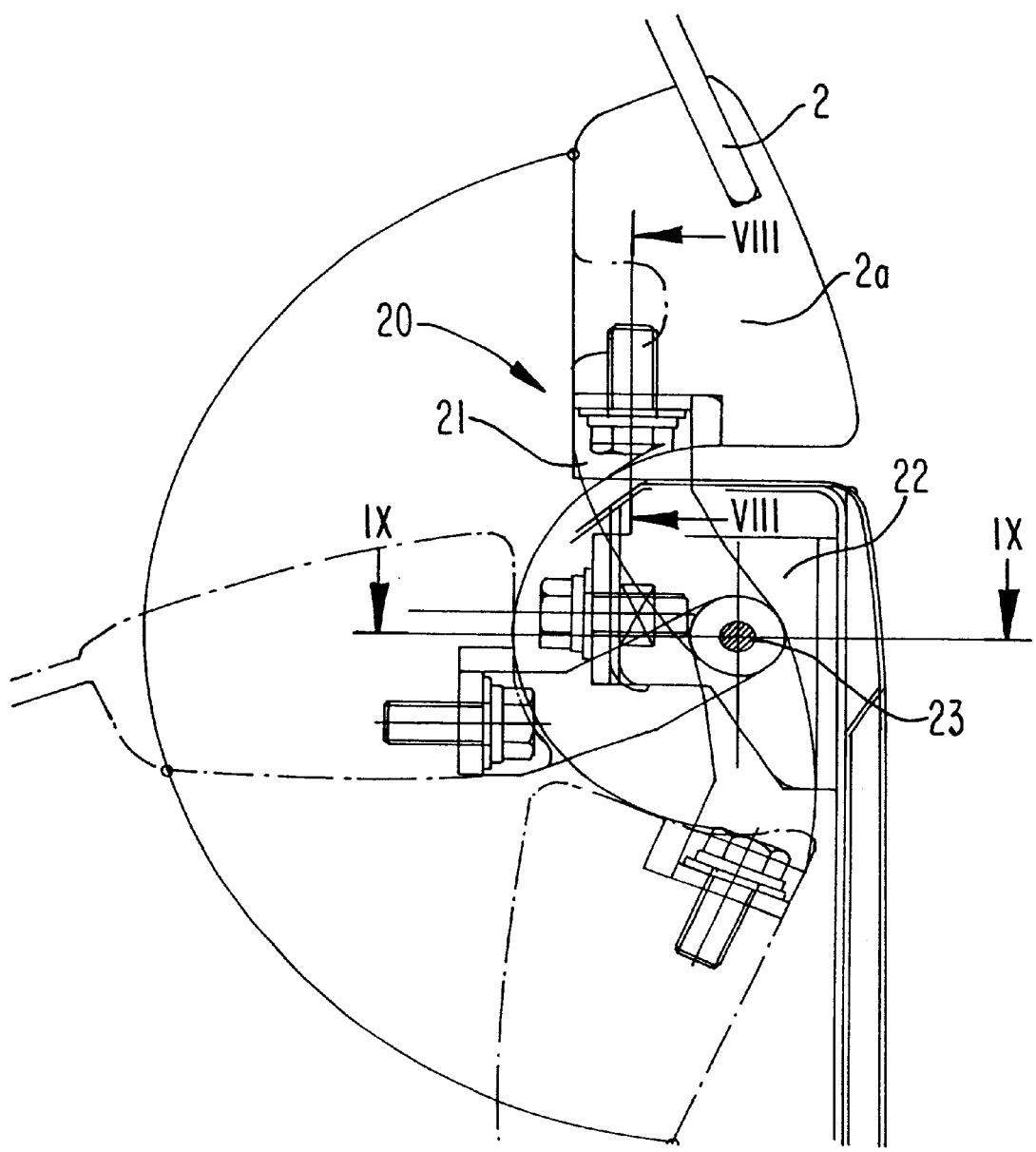
FIG. 6 is a detailed drawing of folding means according to the present invention.

Furthermore, the folding means 20 installed in pairs, each spaced out at a predetermined interval, for stably folding the glass 2 toward the lid panel 1 includes, as shown in FIG. 4, a hinge arm having a "L" shape with one end thereof being fixed via a fixation bolt 24 to a groove formed at a fixation member 2a for supporting the glass 2, and a hinge base 22 to which a fixation end 21a of the hinge arm 21 is fixed via a pivot pin 23 where the hinge base 22 is fixed to the lid panel 1 by the fixation bolt 25.

At this location, the hinge base 22 is formed with a depressed bent part 22a for allowing the hinge arm 21 to rotate therein freely.

Figure 8:
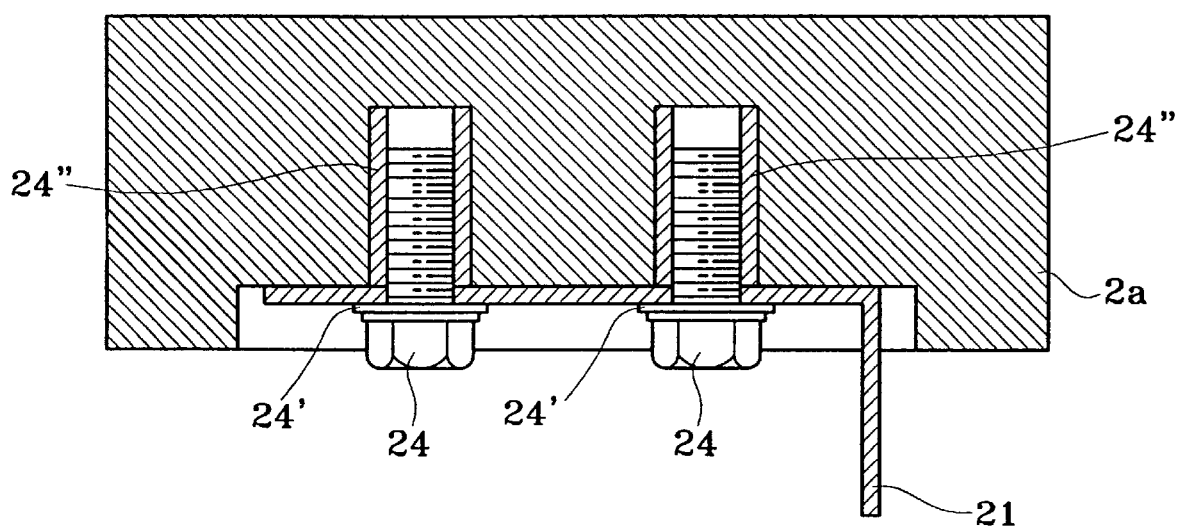
FIG. 8 is a sectional view taken along line VIII—VIII of FIG. 6.
Figure 9:
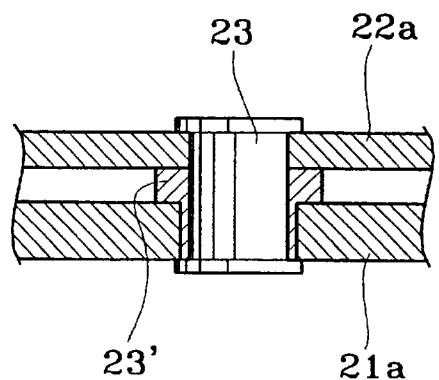
FIG. 9 is a sectional view taken along line IX—IX of FIG. 6.

Furthermore, a fixation bolt 24 is mounted by a washer 24' and an insert 24" as illustrated in FIG. 8 while the pivot pin 23, as shown in FIG. 9, is equipped with a bushing 23' to reduce friction during rotation between the fixation end 1a of the hinge arm 21 and the bent part 22a of the hinge base 22 and to be stably supported.

Meanwhile, locking means 30 installed in pairs, each spaced out at a predetermined interval, for stably holding the glass 2 to the roof panel (R) includes a hook 31 having a housing 31a for receiving a hitching end 31b fixed to the glass 2 and functioning as a lock via resilience, and a locker 32 coupled to the hook 31 and mounted to the roof panel (R) for fixing the glass 2.

Now, operation of the present invention will be described.

Figure 7:
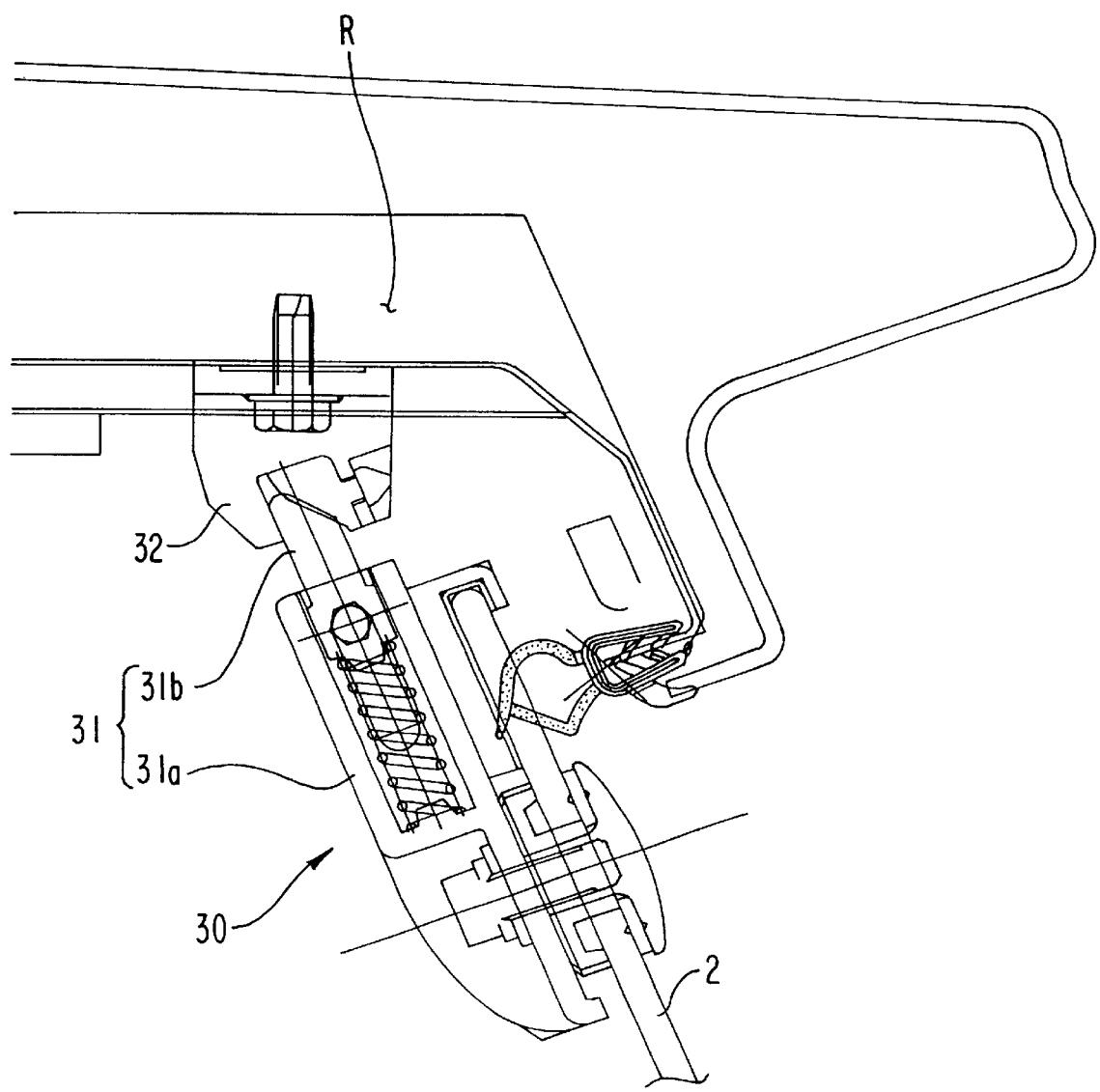
FIG. 7 is a detailed drawing of locking means according to the present invention.

First of all, as illustrated in FIG. 7, when the hitching end 31b, comprising the hook 31 of the locking means 30 for fixing the glass 2, being equipped on the upper ends of the roof panel (R) and the glass 2, each being coupled, is lowered, spring is pressed to make the hitching end 31b detached from the locker 32.

Successively, when the glass 2 deprived of restraining force of locking means 30 is held to be moved to the lid panel 1, the glass 2 is folded onto the lid panel 1 via the folding means 20 coupling the lid panel 1 and the glass 2.

In other words, the hinge arm 21 of the folding means 20 is rotated toward the lid panel 1 via the pivot pin 23 to allow the glass 2 to be fully folded and received into a receiving space 1a of the lid panel 1, as illustrated in FIG. 3.

At this time, it should be apparent that a cushioning pad of soft material such as sponge mounted at the receiving space 1a of the lid panel 1 absorbs the shock of the glass 2.

Successively, when the lid panel 1 where the glass 2 is accommodated is turned backward into the interior of the automobile via hinge pin 13 of pivot means 10, the lid panel 1 is folded onto the floor (F) of the automobile body to open the cargo loading space (W).

As a result, no hindrance is caused by the lid panel 1 and the glass 2 when bulky cargo is loaded into the cargo loading space (W), enabling to load the bulky cargo, and even if space behind the rear of the automobile is narrow, it is easy to open and close the lid panel 1.

Meanwhile, when the lid panel 1 folded onto the floor (F) of automobile body thus described is to be closed again, the lid panel 1 is erected via the hinge pin 13 of pivot means 10, and the glass 2 is held to be lifted toward the roof panel (R), and the hitching end 31b of hook 31 secured to the glass 2 of the locking means 30 is inserted into locker 32 fixed to the roof panel (R) to thereby be locked thereat.

As apparent from the foregoing, there is an advantage in the automotive double folding tailgate thus described in that a tailgate is folded into interior of the automobile body to open cargo loading space (W), such that hindrance caused by a lid panel opened upward and protruded backward when cargo is loaded or unloaded can be removed, thereby enabling to easily open and close the tailgate even in a narrow space at the rear of the automobile.

What is claimed is:

1. An automotive double folding tailgate, the tailgate comprising:
    a lid panel supported on a floor of automobile body via pivot means and a glass foldable at a lower end thereof via folding means mounted at an upper part of the lid panel and releasably mounted to roof panel at an upper end thereof via locking means.

2. The tailgate as defined in claim 1, wherein the pivot means comprises:
    a fixation bracket fixed the floor of the automotive body;
    a connection bracket fixed to a lower end of the lid panel; and
    a hinge pin coupled between the two brackets and functioning as a pivot axle when the lid panel is turned backward into the interior of the automobile.

3. The tailgate as defined in claim 1, wherein the folding means comprises:
    a hinge arm having an "L" shape with on e end thereof being fixed via a fixation bolt to a groove formed at a fixation member for supporting the glass; and
    a hinge base to which a fixation end of the hinge arm is fixed via a pivot pin where the hinge base is fixed to the lid panel by another fixation bolt.

4. The tailgate as defined in claim 3, wherein the hinge base is formed with a depressed bent part for allowing the hinge arm to rotate therein freely.

5. The tailgate as defined in claim 1, wherein locking means comprises:
    a hook having a housing for receiving a hitching end fixed to the glass and functioning as a lock via resilience; and
    a locker coupled to the hook and mounted to the roof panel for fixing the glass.

6. An automotive double folding tailgate, the tailgate comprising:
    a lid panel supported on a floor of automobile body via a pivot and a glass foldable at a lower end thereof via a folding unit mounted at an upper part of the lid panel and releasably mounted to roof panel at an upper end thereof via a locking unit.

7. The tailgate as defined in claim 6, wherein the pivot comprises:
    a fixation bracket fixed the floor of the automotive body;
    a connection bracket fixed to a lower end of the lid panel; and
    a hinge pin coupled between the two brackets and functioning as a pivot axle when the lid panel is turned backward into the interior of the automobile.

8. The tailgate as defined in claim 6, wherein the folding unit comprises:
    a hinge arm having an "L" shape with one end thereof being fixed via a fixation bolt to a groove formed at a fixation member for supporting the glass; and
    a hinge base to which a fixation end of the hinge arm is fixed via a pivot pin where the hinge base is fixed to the lid panel by another fixation bolt.

9. The tailgate as defined in claim 8, wherein the hinge base is formed with a depressed bent part for allowing the hinge arm to rotate therein freely.

10. The tailgate as defined in claim 6, wherein locking unit comprises:
    a hook having a housing for receiving a hitching end fixed to the glass and functioning as a lock via resilience; and
    a locker coupled to the hook and mounted to the roof panel for fixing the glass.

* * * * *